(12) United States Patent
Mansour

(10) Patent No.: US 10,197,662 B2
(45) Date of Patent: *Feb. 5, 2019

(54) WIRELESS LOCAL AREA NETWORK BASED POSITIONING

(71) Applicant: Texas Instruments Incorporated, Dallas, TX (US)

(72) Inventor: Mohamed F. Mansour, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 493 days.

This patent is subject to a terminal disclaimer.

(21) Appl. No.: 14/921,106

(22) Filed: Oct. 23, 2015

(65) Prior Publication Data

US 2016/0047881 A1  Feb. 18, 2016

Related U.S. Application Data

(63) Continuation of application No. 13/466,342, filed on May 8, 2012, now Pat. No. 9,194,935.

(51) Int. Cl.
*G01S 3/02* (2006.01)
*G01S 5/02* (2010.01)
*H04W 64/00* (2009.01)

(52) U.S. Cl.
CPC .......... *G01S 5/0252* (2013.01); *H04W 64/00* (2013.01)

(58) Field of Classification Search
CPC ................ G01S 5/0252; H04W 64/00
USPC ........................................... 342/451
See application file for complete search history.

(56) References Cited

U.S. PATENT DOCUMENTS

| 9,194,935 B2 * | 11/2015 | Mansour | H04W 64/00 |
| 2005/0152312 A1 * | 7/2005 | Marinier | H04W 16/18 |
| | | | 370/332 |
| 2013/0260781 A1 * | 10/2013 | Un | H04W 64/00 |
| | | | 455/456.1 |

* cited by examiner

*Primary Examiner* — Timothy A Brainard
(74) *Attorney, Agent, or Firm* — Michelle F. Murray; Charles A. Brill; Frank D. Cimino

(57) ABSTRACT

A wireless device includes a transceiver and a positioning system. The positioning system a channel model adaptation module having channel model adaptation logic configured to update, for each of a plurality of access points applied to determine a position of a wireless device, a channel model. The channel model adaptation logic having a reference power update module with reference power update logic is configured to update a reference power value corresponding to each access point. A channel model update module with logic is configured to update a path loss exponent value applied to each access point.

20 Claims, 2 Drawing Sheets

WIRELESS LOCAL AREA NETWORK BASED POSITIONING

CROSS REFERENCE TO RELATED APPLICATIONS

This application is a Continuation of and claims priority to U.S. patent application Ser. No. 13/466,342, filed May 8, 2012. Said application incorporated herein by reference in its entirety.

BACKGROUND

As mobile devices proliferate, the demand for services tailored to device location also increases. Location based services depend on positioning systems to determine device location. Satellite based positioning systems, such as the global positioning system (GPS), GLONASS, and Galileo can provide high accuracy, but require a clear line of sight between the satellites and the mobile device to provide a position determination. Consequently, satellite positioning systems are largely ineffective for indoor positioning. Satellite positioning also requires specialized receivers that may increase the cost of the mobile device.

As an alternative or an augmentation to satellite based positioning, wireless local area network (WLAN) based positioning systems have been developed. WLAN based positioning systems are suitable for indoor positioning and require minimal investment because they make use of existing infrastructure. Furthermore, many mobile wireless devices include support for communication via WLAN.

WLAN based positioning systems determine mobile device position based on the established positions of WLAN access points visible to the device and the strength of signals exchanged between the mobile device and the access points.

SUMMARY

Apparatus and method for dynamically updating a channel model used for wireless local area network based positioning are disclosed herein. In one embodiment, a method for positioning includes computing, by a wireless device, a received signal strength value for each wireless local area network access point (AP) visible to the wireless device. A likelihood that the wireless device is positioned at each of a plurality of points based on the received signal strength values is determined. A reference power estimate for each AP is updated based on the likelihoods.

In another embodiment, a wireless device includes a positioning system. The positioning system is configured to determine a position of the device based on signals received from wireless local area network access points. The positioning system is also configured to determine a likelihood that the wireless device is positioned at each of a plurality of points based on a received signal strength value for each of a plurality of access points. The positioning system is further configured to update a reference power estimate for each access point based on the likelihoods.

In a further embodiment, a wireless local area network positioning system includes channel model adaptation logic. The channel model adaptation logic is configured to update, for each of a plurality of access points applied to determine a position of a wireless device, a channel model. The channel model adaptation logic includes reference power update logic and channel model update logic. The reference power update logic is configured to update a reference power value corresponding to each access point. The channel model update logic is configured to update a path loss exponent value applied to each access point.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
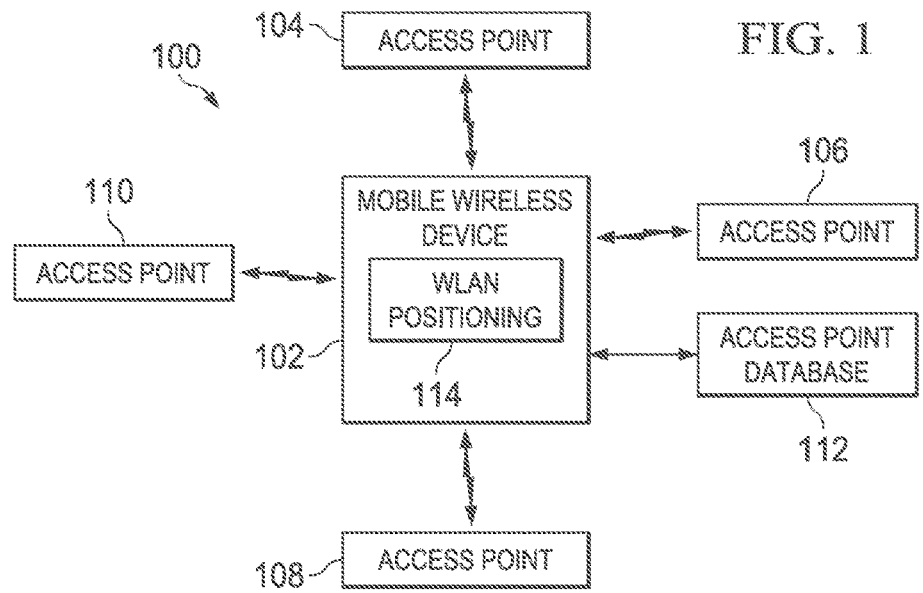
FIG. 1 shows a block diagram of a system for determining the position of a wireless device based on wireless local area network (WLAN) access points (APs) in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In order for a mobile wireless device to establish its location via wireless local area network (WLAN) positioning, the device receives signals transmitted by access points (APs) in the vicinity of the device. The locations of the APs are known, and based on the strengths of the received AP signals the mobile wireless device can estimate its position. If received signal power and distance to an AP are related via a static channel model then the positioning accuracy obtainable by the wireless device may be limited in situations where the static model fails to accurately correspond to the operational environment.

Embodiments of the present disclosure employ a dynamic channel model for WLAN positioning. The reference power for each AP is updated to adapt to the operational environment, and the updated reference power is applied to update the channel model for each AP. Thus, embodiments disclosed herein provide improved WLAN positioning accuracy by adapting the channel model for each AP to the operational environment rather than applying a static model that may fail to accurately represent the operational environment.

FIG. 1 shows a block diagram of a system 100 for using WLAN access points to determine the position of a wireless device in accordance with various embodiments. The system 100 includes a mobile wireless device 102 and a plurality of WLAN access points 104-110. The mobile wireless device 102 is positioned to wirelessly communicate with one or more of the access points 104-110 each associated with a WLAN (e.g., a network in accordance with one or more the IEEE 802.11 standards). In the embodiment of FIG. 1, the mobile wireless device 102 is positioned to receive transmissions from and/or communicate with any of the access points 104-110. The mobile wireless device 102 may be a cellular telephone, a tablet computer, or any other mobile computing device configured for WLAN access. While only four access points and single mobile wireless device are shown in FIG. 1, in practice the system 100 may include any number of mobile wireless devices and access points.

The mobile wireless device 102 includes a WLAN positioning system 114 that determines the position of the mobile wireless device 102 based on the strengths of the signals received from the APs 104-110 and the known positions of the APs 104-110. In some embodiments of the system 100, the AP database 112 provides information regarding the positions of the APs 104-110 to the mobile wireless device 102. For example, the position of each AP 104-110 may be determined using satellite positioning (or other positioning techniques) and stored in the AP database 112 with information that identifies the AP 104-110. The AP database 112 may be contained within the mobile wireless device 102 or accessible to the mobile wireless device 102 via one of the APs 104-110 or via a different communication network (e.g., a wireless wide area network).

The WLAN positioning system 114 provides improved positioning for the mobile wireless device 102 by dynamically adjusting the channel models associated with each of the APs 104-110 in accordance with operating environment. By conforming the AP channel models to the environment in which the system 100 is operating, the mobile wireless device 102 is able to more accurately determine the distance between an AP 104-110 and the mobile wireless device 102, and in turn, more accurately fix its position based on the distances.

Figure 2:
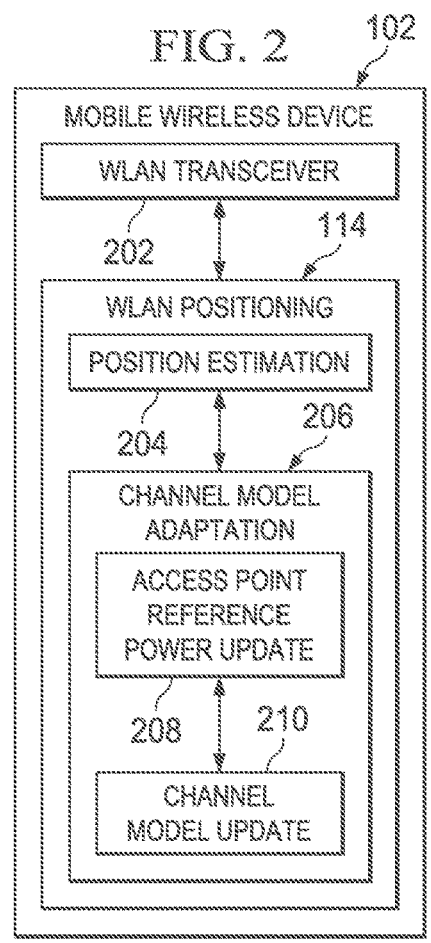
FIG. 2 shows a block diagram of a mobile device configured to update a channel model for each AP as part of positioning in accordance with various embodiments.

FIG. 2 shows a block diagram of the mobile wireless device 102. The mobile wireless device 102 is configured to update a channel model for each AP 104-110 as part of positioning in accordance with various embodiments. The mobile wireless device 102 includes a WLAN transceiver 202 and a WLAN positioning system 114. The WLAN transceiver 202 provides an interface through which the mobile wireless device 102 accesses the wireless medium to communicate with one or more of the APs 104-110. The WLAN transceiver 202 receives signals transmitted by the APs 104-110 and derives signal strength values, such as received signal strength indicator (RSSI) values, from the received signals, that may be used to estimate distance between the mobile wireless device 102 and the APs 104-110 for WLAN-based positioning.

The WLAN positioning system 114 is coupled to the WLAN transceiver 202. The WLAN positioning system 114 includes a position estimation module 204 and a channel model adaptation module 206. The position estimation module 204 is configured to estimate the position of the wireless device 102 based on a known position of each AP 104-110, the received signal strength values for each AP 104-110, and the channel model for each AP 104-110. In some embodiments, the WLAN transceiver 202 provides received signal strength values to the WLAN positioning system 114, and the AP database 112 provides AP location information for use in mobile wireless device 102 position determination.

The channel model adaptation module 206 communicates with the position estimation module 204. The channel model adaptation module 206 is configured to dynamically update the channel model for each AP 104-110, and provide the updated channel model to the position estimation module 204 for use in positioning. The channel model adaptation module 206 updates the channel model for each AP 104-110 based on likelihood values generated by the position estimation module 204 as part of the position determination.

Various components of the mobile wireless device 102 including at least some portions of the WLAN positioning system 114 can be implemented using a processor executing software programming that causes the processor to perform the operations described herein. In some embodiments, the WLAN positioning system 114 includes a processor executing software instructions that causes the processor to dynamically update the channel models associated with the APs 104-110 as disclosed herein, and to apply the dynamically updated channel models to improve the positioning accuracy of the mobile wireless device 102.

Suitable processors include, for example, general-purpose microprocessors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming (i.e., processor executable instructions) that causes a processor to perform the operations disclosed herein can be stored in a computer readable storage medium. A computer readable storage medium comprises volatile storage such as random access memory, non-volatile storage (e.g., a hard drive, an optical storage device (e.g., CD or DVD), FLASH storage, read-only-memory), or combinations thereof. Processors execute software instructions. Software instructions alone are incapable of performing a function. Therefore, in the present disclosure any reference to a function performed by software instructions, or to software instructions performing a function is simply a shorthand means for stating that the function is performed by a processor executing the instructions.

In some embodiments, portions of the mobile wireless device 102, including portions of the WLAN positioning system 114 may be implemented using dedicated circuitry (e.g., dedicated circuitry implemented in an integrated circuit). Some embodiments may use a combination of dedicated circuitry and a processor executing suitable software. For example, some portions of the WLAN positioning system 114 may be implemented using a processor or hardware circuitry. Selection of a hardware or processor/ software implementation of embodiments is a design choice based on a variety of factors, such as cost, time to implement, and the ability to incorporate changed or additional functionality in the future.

While embodiments of the mobile wireless device 102 are applicable to any operational environment, WLAN positioning is frequently used in an indoor environment. The propagation model for an indoor WLAN channel may be approximated by the log-normal shadowing model expressed as:

$$R(\text{dB}) = \alpha + 10n\log_{10}(d_0/d) + w \quad (1)$$

where:
R is the power in dB of received signal;
d is the distance between the mobile wireless device 102 and the AP 104-110;
$d_0$ is a reference fixed distance from the AP 104-110 (typically less than 2 m);
n is the path loss exponent;
$\alpha$ is the reference power at distance $d_0$; and
w is a zero-mean white Gaussian noise with variance $\sigma^2$.

Signal attenuation over distance, or path loss, may be represented by a path loss exponent. The path loss exponent, n, is typically a function of distance. If the mobile wireless device 102 is close (e.g., less than 6 meters) to an AP (e.g., the AP 104), then n is typically 2, whereas for medium distances n may exhibit wider variation in the range of 2-5. For large distances, e.g., greater than 60 meters (where the received power is close to the receiver sensitivity), n may be near zero, i.e., the received power changes very little with increased distance. Therefore, embodiments of the WLAN positioning system 114 parameterize received power versus distance as three piecewise-linear and continuous regions, each region having its own slope and constant term, i.e., in the i-th region the received signal power (or the RSSI) may be approximated as:

$$y = a_i x + b_i \quad (2)$$

where:
y refers to the power (in dB), and
X refers to $\log_{10}(d_0/d)$.

The anchor points of the piece-wise linear curve (i.e., the boundaries of each region) are $(x_1, y_1)$ and $(x_2, y_2)$. In the dynamic model generated by the WLAN positioning system 114 while making positioning measurements, the channel model update module 210 computes a different value of $b_i$ and $x_i$ for each AP 104-110 (i.e., the WLAN positioning system 114 applies a distinct channel model for each AP 104-110).

Figure 3:
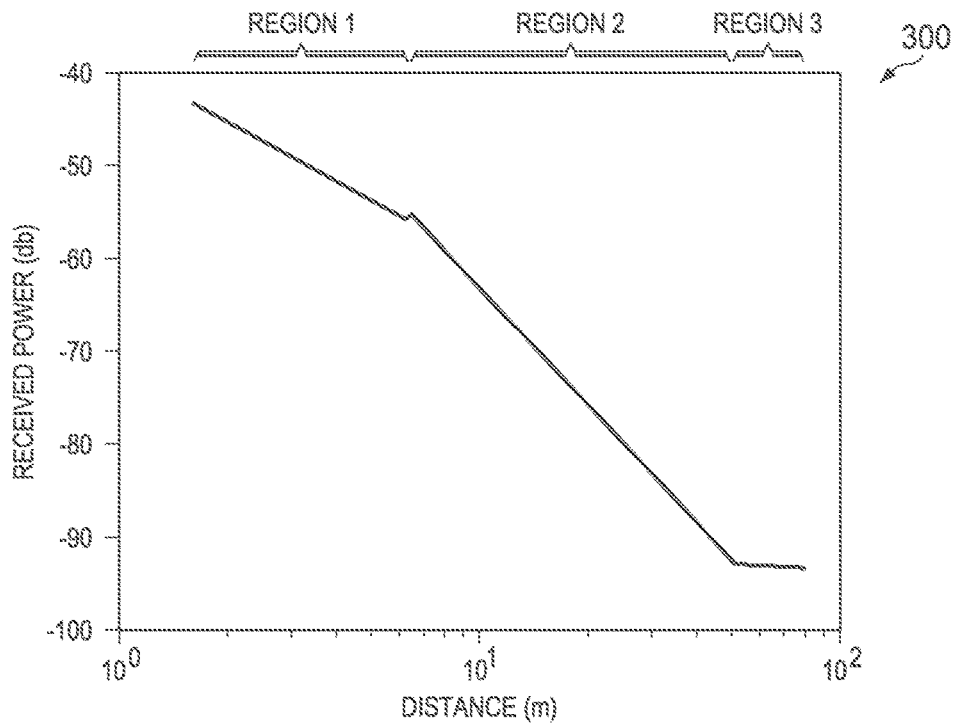
FIG. 3 shows a graphical depiction of power versus distance for an AP channel model that is updated during positioning in accordance with various embodiments.

FIG. 3 shows a graphical depiction of the piecewise-linear channel model 300 produced by the channel model adaptation module 206 and applied by position estimation module 204 to estimate the position of the mobile wireless device 102 in accordance with various embodiments. The channel model defines distance as a function of power of received signal.

The slope of the third region, which corresponds to −92 dbm and higher, is almost flat. Consequently, within the third region, the received signal power does not provide much distance information, and some embodiments of the WLAN positioning system 114 may omit the third region from the channel model. Each region of the channel model may have a different value for the received signal strength measurement. Some embodiments of the WLAN positioning system 114 set the standard deviation as [6,4,7]-dB for the three regions.

Figure 4:
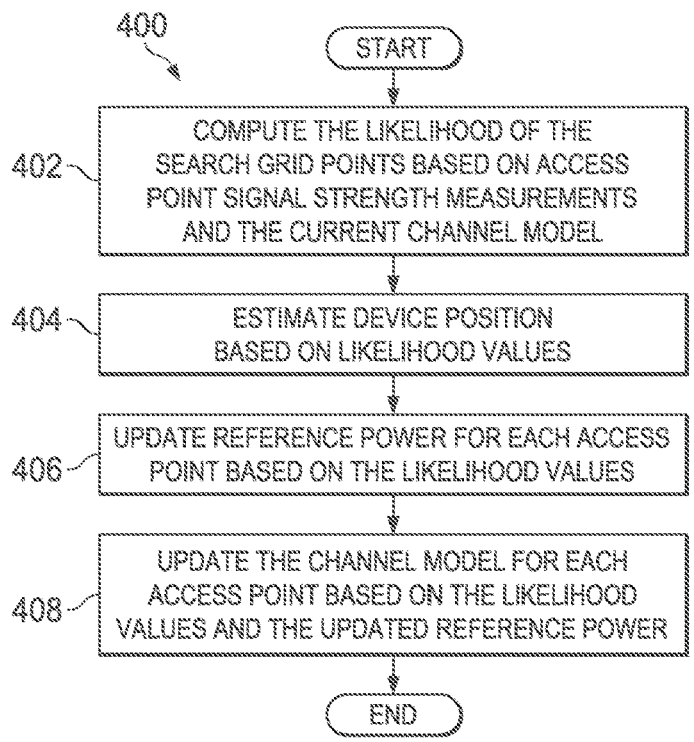
FIG. 4 shows a flow diagram for a method for updating an AP channel model while positioning in accordance with various embodiments.

The reference power $\alpha$ can vary across the different APs 104-110, and for a given AP 104-110 can fluctuate over time. The channel model adaptation module 206 dynamically estimates the reference power $\alpha$ from the received signal strength measurements corresponding to signals received from the APs 104-110. FIG. 4 shows a flow diagram for a method 400 for dynamically updating an AP channel model while positioning in accordance with various embodiments. Though depicted sequentially as a matter of convenience, at least some of the actions shown can be performed in a different order and/or performed in parallel. Additionally, some embodiments may perform only some of the actions shown. The operations of the method 400 can be performed by the WLAN positioning system 114. In some embodiments, at least some of the operations of the method 400, as well as other operations described herein, can be performed by a processor executing instructions stored in a computer readable medium.

In block 402, the wireless device 102 is receiving signals transmitted by the APs 104-110. The WLAN transceiver 202 processes the received signals and generates received signal strength values (e.g., RSSI) for each AP 104-110. The WLAN transceiver provides the received signal strength values to the WLAN positioning system 114. The position estimation module 204 applies the current channel model for each of the APs 104-110 and the received signal strength values to compute likelihood values for each point of a search grid that defines the various points at which the mobile wireless device 102 may be positioned. The position of the mobile wireless device 102 is determined, in block 404, based on the likelihood values, and the likelihood values are provided to the channel model adaptation module 206 to facilitate channel model adjustment.

In block 406, the reference power for each AP 104-110 is adjusted. The AP reference power update module 208 may perform the adjustments. Assuming N grid points used in a minimum mean square estimation (MMSE) search procedure, where:
$P_k$ denotes the probability (i.e., the exponential of the likelihood function) of being at the k-th grid point;
$d_{jk}$ denotes the distance between the k-th grid point and the j-th AP;
$R_j$ denotes the received signal strength reading of the j-th AP; and
$(x_1^{(j)}, y_1)$ and $(x_2^{(j)}, y_2)$ are the anchor points per equation (2) for the j-th grid point.

For each region of the piecewise linear channel model of equations (1) and (2), the AP reference power update module 208 finds $\{d_{jk}\}_k$ that lie in that region, and computes the weighted difference:

$$q_j = \sum_{i=1:3} \sum_k (R_j - a_i \log_{10}(d_{jk}/d_0) - b_i^{(j)}) P_k, \quad (3)$$

where $$\sum_k$$

is summation over the grid points within a selected one of the three regions. The reference power of the j-th AP is updated from $\alpha$ to $\alpha + \alpha_j$ where $\alpha_j$ is updated as (with $\alpha_j$ initially set to zero):

$$\alpha_j = (1-\mu)\alpha_j + \mu q_j, \quad (4)$$

where μ is a smoothing parameter that may have a range of [0.01,0.1]. Some embodiments of the AP reference power update module 208 apply a clipping function to prevent large swings in $\alpha_j$. The change in $\alpha_j$ is:

$$\delta_j = \mu(q_j - \alpha_j) \tag{5}$$

Embodiments of the AP reference power update module 208 apply the operations associated with equations (3)-(5) to generate an updated reference power value for each AP 104-110.

Operations performed to update the reference power may be expressed in pseudo-code as follows:

```
Compute the a posteriori probability for each grid point (it
    equals exp(likelihood)).
Normalize the probability of the selected grid points such that
    they sum to unity
For the i-th AP
    For each grid point
        Determine the curvilinear region of the distance
        Compute the difference between the RSSI value and the
            mean (that is computed from the corresponding line
            segment of the curvilinear region assuming the
            estimated position is the true position)
        Weigh the difference by the point probability as in
            equation (3)
        Add the weighted difference to the aggregate average
    endFor
    The new alpha estimate is the difference mean.
    Use the smoothing in equation (4) to compute the new alpha.
endFor
```

In block 410, the channel model associated with each AP 104-110 is adjusted. The channel model update module 210 may perform the adjustments. For each AP 104-110, the channel model update module 210 employs the updated reference power value for the AP 104-110 to update the channel model for the AP 104-110. Updating the channel model includes updating the anchor points $y_1^{(j)}$ and $x_2^{(j)}$, and the constant term $b_3^{(j)}$ of equation (2). The channel model update module 210 updates the piece-wise linear curve of the model using updated reference power and ensures that the segments of the updated channel model form a continuous curve.

The variables of the update process include $\{a_i^{(j)}, b_i^{(j)}\}$, where $i \in \{1,2,3\}$ and $\{x_i^{(j)}, y_i^{(j)}\}$, where $i \in \{1,2\}$ denotes the region, and j denotes the AP index. In some embodiments, for each AP 104-110 there are 10 variables in the model. In some embodiments, $\{a_1^{(j)}, a_2^{(j)}, a_3^{(j)}, b_1^{(j)}, b_2^{(j)}, x_1^{(j)}, y_2^{(j)}\}$ are fixed for all regions and all APs 104-110. The new estimate of reference power compensation $\alpha_j$ is added to the constants $\{b_1^{(j)}, b_2^{(j)}\}$. The values of $y_1^{(j)}, x_2^{(j)}$, and $b_3^{(j)}$ are updated for consistency with the updated values of $\{b_1^{(j)}, b_2^{(j)}\}$. An updated value of $y_1^{(j)}$ is computed by adding $\alpha_j$ to the current value:

$$y_1^{(j)} = a_1^{(j)} x_1^{(j)} + b_1^{(j)} + \alpha_j = a_2^{(j)} x_1^{(j)} + b_2^{(j)} + \alpha_j \tag{6}$$

The anchor point $x_2^{(j)}$ is updated such that $y_2$ is unchanged:

$$y_2^{(j)} = a_2^{(j)} x_2^{(j)} + b_2^{(j)} + \alpha_j \tag{7}$$

$x_2^{(j)}$ is derived from equation (7) as:

$$x_2^{(j)} = (y_2^{(j)} - b_2^{(j)} - \alpha_j)/a_2^{(j)} \tag{8}$$

$b_3^{(j)}$ is updated based on continuity with $x_2^{(j)}$ as:

$$b_3^{(j)} = y_2^{(j)} - a_3^{(j)} x_2^{(j)} - \alpha_j \tag{9}$$

After computing these parameters, the channel model update module 210 computes the received power mean from the j-th AP at a distance d in the likelihood computation (with d assumed to be in the k-th region) as:

$$y = a_k^{(j)} \log_{10}(d/d_0) + b_k^{(j)} + \alpha_j \tag{10}$$

The channel model update module 210 repeats the operations associates with equations (6)-(10) to update the channel model for each AP 104-110.

By application of the above operations, the channel model adaptation module 206 changes the constant term (i.e., constant coefficient) of the linear segments of the channel model, based on the updated AP reference power, to adjust for channel variation. As part of updating the channel model, the channel model update module 210 also updates the slopes of at least some of the linear segments of the channel model. The slopes represent the path loss exponent. Some embodiments of the channel model adaptation module 206 may update the slope of only region 2 of the channel model.

Referring again to FIG. 3, the channel model has three regions: the first region represents the line of sight (LOS) component, and the path loss exponent in this region is approximately two, which is the free space propagation loss. In some embodiments, the boundary of the first region may be about 6 meters from the access point. The second (middle) region is where most visible access points typically exist. The channel model update module 210 updates the path loss exponent of the second region. The third region is mostly a saturation region, and its onset boundary is defined by the detection sensitivity of the WLAN transceiver 202, which is, for example, about −94 dB. Perceived RSSI changes slowly with distance in the third region.

Some embodiments of the channel model update module 210 apply the Recursive Least Squares (RLS) algorithm to update the slope of region 2 of the channel model. The estimated position of the wireless device 102 and the corresponding received signal strength measurements, as well as the updated reference power for each AP 104-110, are inputs to the slope adaptation algorithm.

For each AP 104-110, region 2 of the channel model may be expressed as:

$$\text{RSSI(dB)} = b + a \log_{10}(d/d_0) \tag{11}$$

where:
b is a constant that includes the updated reference power for a given AP 104-110; and.
d is the distance between the estimated position of the wireless device 102 and the given AP 104-110.

Updating the path loss exponent adjusts the value of the slope a in accordance with the observed received signal strength (RSSI) and the position of the mobile wireless device 102. The channel model update module 210 may update the slope for each AP 104-110.

The channel model update module 210 applies RLS to update the slope, where:
y=ax;
x=$\log_{10}$(d/d$_0$); and
y=RSSI−b.
The RLS equations include:

$$P(n) = C(n)x$$

$$K(n) = P(n)/(\lambda + x \cdot P(n))$$

$$e(n) = y - a(n) \cdot x$$

$$a(n+1) = a(n) + K(n) \cdot e(n)$$

$$C(n+1) = \lambda^{-1}(C(n) - K(n) \cdot x \cdot C(n))$$

where:
a(n) is the current estimate of the slope;
C(n) is the corresponding covariance estimate;

λ is a forgetting factor that determines the rate of change (it is typically close to 1); and C(0), the initial co-variance estimate, reflects the confidence in the initial estimate.

In some embodiments, λ=0.999 and C(0)=0.01.

To avoid extreme values of the path loss exponent, the channel model update module 210 updates the slope a(n+1) and the corresponding covariance C(n+1) only if the new path loss exponent is within predetermined limits, e.g., [2.5,5.0]. If the new path loss exponent value is outside the limits, the slope is not updated.

In some embodiments of the WLAN positioning system 114, the path loss exponent update is performed after the grid search, and uses the MMSE estimate rather than a final estimate, such as the output from a Kalman filter.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A mobile wireless device for wireless local area network positioning, the mobile wireless device comprising:
    at least one processor coupled to a transceiver; and
    a non-transitory computer readable storage medium storing a program for execution by the at least one processor, the program including instructions to:
        receive, from a plurality of access points, a plurality of signals;
        update, for each of the plurality of access points, a channel model,
            to update reference power values corresponding to each of the plurality of access points based on the plurality of signals; and
        update path loss exponent values corresponding to each of the plurality of access points.

2. The mobile wireless device of claim 1, wherein the instructions further comprise instructions to:
    determine likelihoods that the mobile wireless device is positioned at each of a plurality of points of a positioning grid based on received signal strength indicator (RSSI) values for the signals received from the plurality of access points, and
    update the reference power values based on the likelihoods.

3. The mobile wireless device of claim 1, wherein the instructions further comprise instructions to update constant coefficients and endpoints of each of a plurality of linear segments of the channel model, wherein each linear segment corresponds to a linear function of the path loss exponent values.

4. The mobile wireless device of claim 1, wherein the instructions further comprise instructions to update the path loss exponent values for a linear segment of the channel model, to generate an updated path loss exponent, the linear segment representing a portion of a channel beyond a free space portion of the channel.

5. The mobile wireless device of claim 4, wherein the instructions further comprise instructions to determine the updated path loss exponent by recursive least squares estimation based on a current slope value, RSSI values, updated reference power estimates, and an estimated distance from the mobile wireless device to an access point.

6. The mobile wireless device of claim 5, wherein the instructions further comprise instructions to limit a value of the current slope based on value, in response to determining that the updated path loss exponent is within a predetermined range of values that are greater than path loss exponent values corresponding to free space.

7. The mobile wireless device of claim 4, wherein the instructions further comprise instructions to update a slope of the linear segment based on the updated path loss exponent.

8. A method for local area network positioning, the method comprising:
    receiving, by a mobile wireless device from a plurality of access points, a plurality of signals;
    updating, by the mobile wireless device, for each of the plurality of access points, a channel model, to update reference power values corresponding to each of the plurality of access points based on the plurality of signals; and
    updating, by the mobile wireless device, path loss exponent values corresponding to each of the plurality of access points.

9. The method of claim 8, further comprising:
    determining likelihoods that the mobile wireless device is positioned at each of a plurality of points of a positioning grid based on received signal strength indicator (RSSI) values for the signals received from the plurality of access points; and
    updating the reference power values based on the likelihoods.

10. The method of claim 8, further comprising updating constant coefficients and endpoints of each of a plurality of linear segments of the channel model, wherein each linear segment corresponds to a linear function of a path loss exponent.

11. The method of claim 8, further comprising updating a path loss exponent for a linear segment of the channel model, to generate an updated path loss exponent, the linear segment representing a portion of a channel beyond a free space portion of the channel.

12. The method of claim 11, further comprising determining the updated path loss exponent by recursive least squares estimation based on a current slope value, RSSI values, updated reference power estimates, and an estimated distance from the mobile wireless device to an access point.

13. The method of claim 12, further comprising limiting a value of the current slope value, in response to determining that the updated path loss exponent is within a predetermined range of values that are greater than path loss exponent values corresponding to free space.

14. The method of claim 11, further comprising updating a slope of the linear segment based on the updated path loss exponent.

15. A non-transitory computer readable storage medium storing a program for execution by at least one processor of a mobile wireless device, the program including instructions to:
    receive, from a plurality of access points, a plurality of signals;
    update, for each of the plurality of access points, a channel model to update reference power values corresponding to each of the plurality of access points based on the plurality of signals; and
    update path loss exponent values corresponding to each of the plurality of access points.

16. The non-transitory computer readable storage medium of claim 15, wherein the instructions further comprise instructions to:

determine likelihoods that the mobile wireless device is positioned at each of a plurality of points of a positioning grid based on received signal strength indicator (RSSI) values for the signals received from the plurality of access points; and update the reference power values based on the likelihoods.

17. The non-transitory computer readable storage medium of claim 15, wherein the instructions further comprise instructions to update constant coefficients and endpoints of each of a plurality of linear segments of the channel model, wherein each linear segment corresponds to a linear function of a path loss exponent.

18. The non-transitory computer readable storage medium of claim 15, wherein the instructions further comprise instructions to update a path loss exponent for a linear segment of the channel model, to generate an updated path loss exponent, the linear segment representing a portion of a channel beyond a free space portion of the channel.

19. The non-transitory computer readable storage medium of claim 18, wherein the instructions further comprise instructions to determine the updated path loss exponent by recursive least squares estimation based on a current slope value, RSSI values, updated reference power estimates, and an estimated distance from the mobile wireless device to an access point.

20. The non-transitory computer readable storage medium of claim 18, wherein the instructions further comprise instructions to update a slope of the linear segment based on the updated path loss exponent.

* * * * *